(12) United States Patent
Baughn et al.

(10) Patent No.: US 6,260,356 B1
(45) Date of Patent: Jul. 17, 2001

(54) CONTROL METHOD AND APPARATUS FOR AN ELECTRO-HYDRAULIC POWER ASSISTED STEERING SYSTEM

(75) Inventors: Bernard Dale Baughn, Livonia; Timothy Matthew Staton, Ypsilanti, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/478,606

(22) Filed: Jan. 6, 2000

(51) Int. Cl.[7] .................................................. F16D 31/02
(52) U.S. Cl. .................................................. 60/431
(58) Field of Search ........................... 60/431; 180/422, 180/423

(56) References Cited

U.S. PATENT DOCUMENTS

| | | |
|---|---|---|
| 4,056,160 * | 11/1977 | Abels et al. ................... 60/431 X |
| 4,392,540 | 7/1983 | Michio et al. ...................... 180/422 |
| 4,485,623 * | 12/1984 | Chicester et al. ...................... 60/422 |
| 4,518,055 * | 5/1985 | Yagi et al. ........................... 180/422 |
| 4,662,466 | 5/1987 | Eto et al. ............................. 180/422 |
| 4,773,498 | 9/1988 | Eto et al. ............................. 180/422 |
| 5,267,627 | 12/1993 | Frank et al. . |
| 5,279,380 | 1/1994 | Frank et al. . |
| 5,659,473 * | 8/1997 | Noro et al. ...................... 180/422 X |
| 5,761,627 | 6/1998 | Seidel et al. ...................... 180/442 X |
| 5,762,159 | 6/1998 | Matsuoka et al. .................. 180/422 |
| 5,936,379 * | 8/1999 | Matsuoka ........................ 180/422 X |
| 5,995,890 * | 11/1999 | Permuy .......................... 180/422 X |

* cited by examiner

Primary Examiner—John E. Ryznic
(74) Attorney, Agent, or Firm—Gregory P. Brown

(57) ABSTRACT

A power assisted steering system 12 has a control valve 28, a pump 22 coupled to the control valve 28, and a motor 20 coupled to the pump. A controller 18 is coupled to the motor. The controller generates a control signal having a voltage and a current. The controller 18 generates a desired motor current in response to a desired flow rate and valve angle of the control valve 28.

5 Claims, 3 Drawing Sheets

CONTROL METHOD AND APPARATUS FOR AN ELECTRO-HYDRAULIC POWER ASSISTED STEERING SYSTEM

TECHNICAL FIELD

The present invention relates generally to power steering systems for automotive vehicles, and more specifically, to a control method for controlling an electro-hydraulic power assisted steering system.

BACKGROUND

Conventional power assisted steering systems use an engine driven hydraulic pump to provide fluid to a steering mechanism. The steering mechanism has an open center steering control valve that regulates fluid pressure and directs the pressure to the appropriate side of a hydraulic cylinder to provide power assist to steer the vehicle through a linkage system. The cylinder and its associated piston are usually an integral part of the steering mechanism. The engine driven pump of the conventional system has an integral flow control valve that regulates steering to the steering mechanism at an approximately constant rate. The power consumed by this system is proportional to the engine speed and pump outlet pressure. Pumps in such conventional systems are sized to produce the required system flow at engine idle speed. At speeds above idle speed, the integral flow control valve returns excess flow back to the pump. Thus, the energy required to produce the excess flow at a pump outlet pressure is a parasitic loss. A steering control valve is used in a conventional system to control a relationship between valve steering torque and assist pressure. A torsion bar such as a linear torsional spring is used to convert steering torque into valve actuation angle. The relationship of the valve actuation angle and the assist pressure for a constant flow rate is referred to as a boost curve.

Recently, electro-hydraulic power assisted steering systems have been developed. Electro-hydraulic power assisted steering systems have an electric motor that is used to drive a positive displacement pump without an internal flow control valve. System flow is thus controlled by controlling the speed of the motor. In electro-hydraulic power assisted steering systems, the subjective feel of the system is also a function of the boost curve. To reduce total energy, electro-hydraulic power assisted steering systems reduce parasitic losses associated with an engine driven pump and flow control valve. Commonly, system flow is varied in proportion to the turning rate of the steering wheel and the speed of the vehicle. This allows the system flow to be reduced in the non-steering condition. Commonly, flow is also reduced with increased vehicle speed. Lower flows at higher vehicle speeds improve the center feel of the steering, while higher flows at lower speeds and static parking reduce the effort the driver must exert to steer the vehicle. The boost curve changes directly as a function of flow rate.

In designing an electro-hydraulic power assisted steering systems, typically trade-offs must be made. Center feel may be optimized with a high torsion bar stiffness and a boost curve that provides little or no assist at low to moderate steering wheel torques. A low parking effort may be achieved with a low torsion bar stiffness, quick closing boost curve and high flow rates.

It would therefore be desirable to provide an electro-hydraulic power assisted steering system that provides improved steering feel at all the vehicle speeds.

SUMMARY OF THE INVENTION

The present invention thus provides a control strategy for an electro-hydraulic power assisted steering system over a range of vehicle speeds. The present invention provides improved steering feel over the various speeds of the vehicle while providing steering gain linearity at intermediate vehicle speeds without compromising torsion bar stiffness.

In one aspect of the invention, a power assist steering system for an automotive vehicle comprises a control valve, a pump coupled to the control valve, and a motor coupled to the pump. A controller is coupled to the motor. The controller generates a control signal having a voltage and a current, said controller generating a desired motor current in response to a desired flow rate and valve angle of the control valve.

In a further aspect of the invention, a method of controlling a steering system having a pump and a motor comprises the steps of:

detecting electric current to the motor;

determining a pump outlet pressure as a function of a motor current;

determining a desired flow rate to attain a desired boost curve as a function of pump outlet pressure and vehicle speed; and operating the pump to attain the desired boost curve.

Advantages of the invention include reduced parking efforts, gain linearity is improved, center feel is improved at high speeds, fuel economy is improved and peak current draw of the system is reduced.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
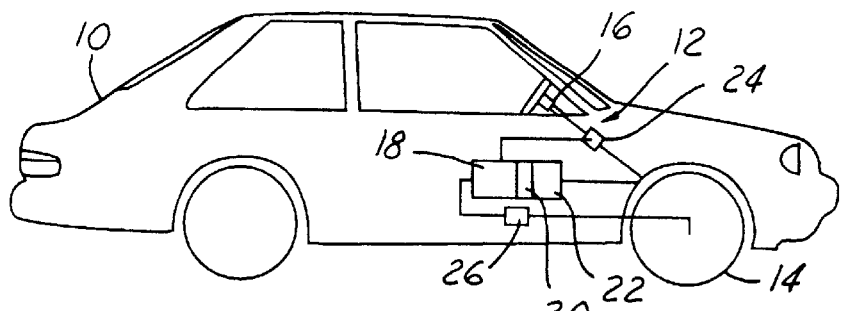
FIG. 1 is a perspective view of an automotive vehicle having a power steering system according to the present invention.

In the following figures, the same reference numerals will be used to identify identical components.

Referring now to FIG. 1, an automotive vehicle 10 has a steering system 12 that is coupled to the front wheels 14 of automotive vehicle 10. Steering system 12 has a steering wheel 16 that is used to provide operator input.

Steering system 12 is preferably an electro-hydraulic power assisted steering system. Steering system 12 has a controller 18 that is preferably microprocessor based. Controller 18 is coupled to a motor 20 that is used to drive a pump 22. Pump 22 is not belt driven by the engine of the automotive vehicle 10 as in conventional steering systems. Conventional steering systems typically include an integral flow control valve that regulates flow to the steering system. The flow control valve regulates the amount of flow to the steering system. Otherwise, such a system would have a flow proportional to the engine speed. In the electro-hydraulic power assisted steering system 12, the speed of motor 20 is controlled by controller 18 which in turn directly controls pump 22.

Controller 18 may be coupled to steering wheel sensors 24 and wheel speed sensor 26. Steering wheel sensors may include a steering rate sensor and a steering wheel angle sensor. Wheel speed sensor 26 may include a wheel speed sensor at each wheel that is known to those skilled in the art. Controller 18 may use the inputs from steering wheel sensors 24 and wheel speed sensors 26 to control various steering effort at a desired rate.

Figure 2:
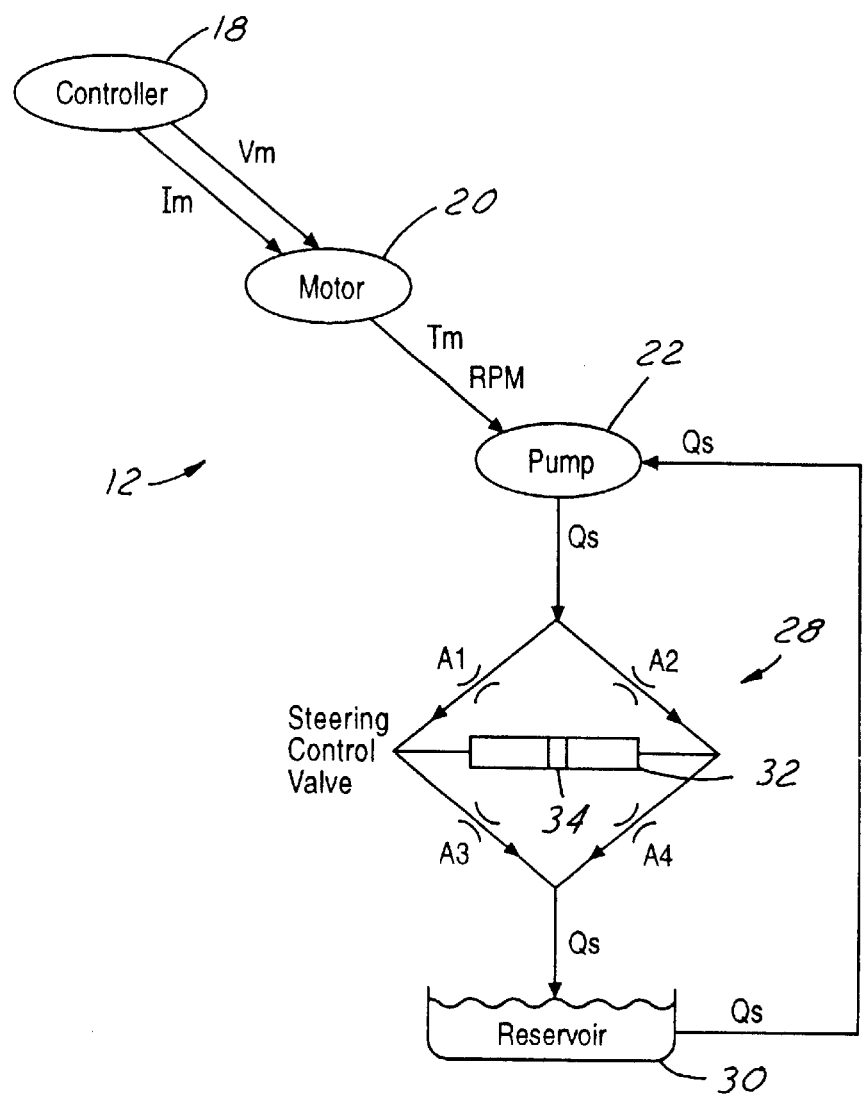
FIG. 2 is a block diagram of a power steering system according to the present invention.

Referring now to FIG. 2, a general block diagram of steering system 12 is illustrated. As in FIG. 1, controller 18 is coupled to motor 20 which in turn is coupled to pump 22. Pump 22 is coupled to a steering control valve 28. Steering control valve is coupled to reservoir 30. Reservoir 30 in turn is coupled to pump 22.

Controller 18 uses current (Im) and voltage (Vm) to control the motor 20. Motor 20 is coupled to pump 22 and provides a torque (Tm) and speed in rpms to pump 22. Pump 22 has a pump and outlet pressure and controls the flow rate (Qs) to steering control valve. Steering control valve has a cylinder 32 with a piston 34 therein. Steering control valve 28 has four orifices A1, A2, A3, and A4. Orifices A1 through A4 are used to control the amount of steering assist in the right and left directions. Thus, from steering control valve the system f low rate (Qs) is returned to reservoir and back to pump 22.

Conventional electro-hydraulic power assisted steering systems normally vary the flow in proportion to the turning rate of the wheel and the speed of the vehicle. The increase in flow as a function of the steering wheel rate allows the system flow rate (Qs) to be reduced in the non-steering condition resulting in a reduction in the system power consumption. This may result in a non-linear feel. The present invention flow rate and pressure is varied to obtain a desired feel at various speed and wheel angles.

Figure 3:
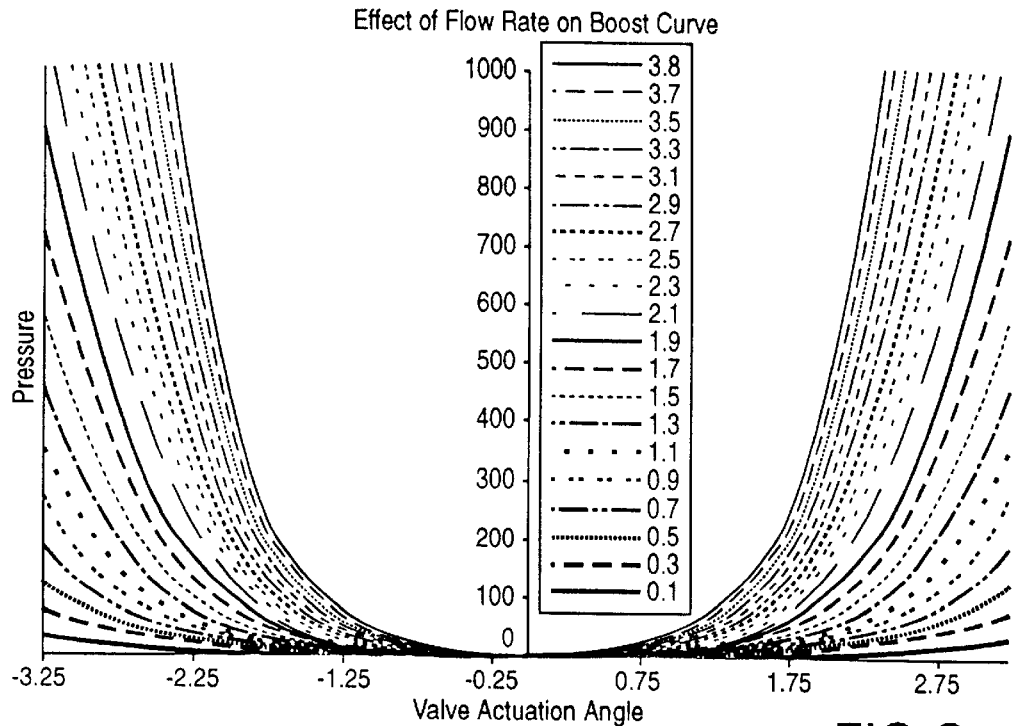
FIG. 3 is a plot of pressure versus valve angle for various flow rates.

Referring now to FIG. 3, a plot of a conventional electro-hydraulic power assisted steering system valve angle versus pressure at different flow rates is illustrated. Flow is typically reduced with increasing vehicle speed. Lower flows at higher vehicle speeds improve the center feel of the vehicle while higher flows at lower vehicle speeds and at static parking conditions reduce the effort that the driver must exert to steer the vehicle. Each boost curve changes with flow rate.

Figure 4:
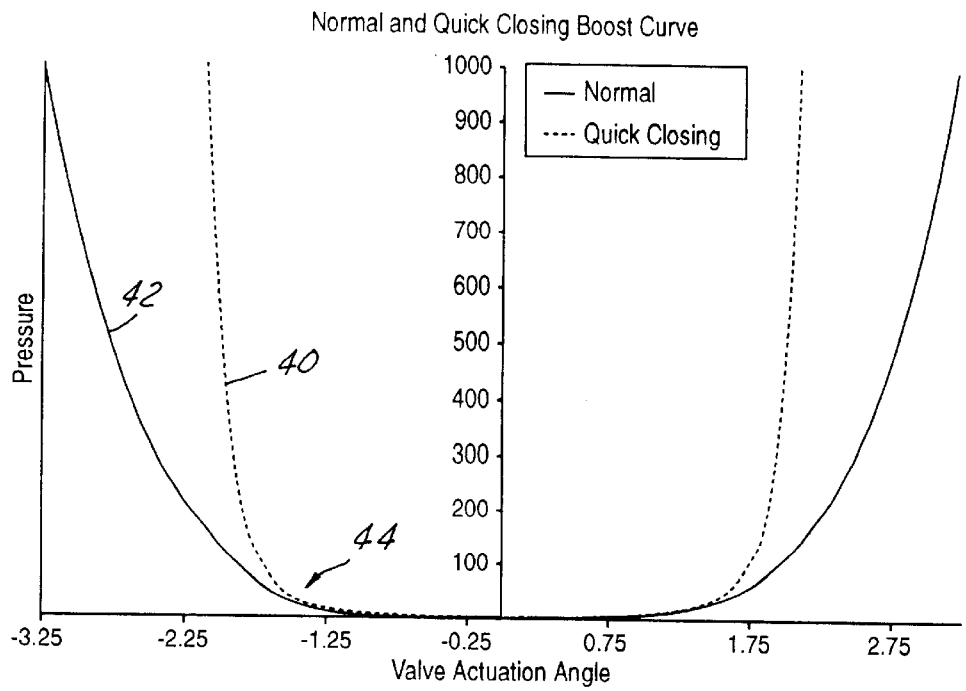
FIG. 4 is a plot of normal and quick closing boost curves in pressure versus angle valve actuation.

Referring now to FIG. 4, as mentioned above, steering control valve 28 is preferably a quick closing steering control valve.

In FIG. 4, a typical boost curve 40 of a quick closing valve is illustrated in comparison to a boost curve 42 for a conventional steering control valve. A quick closing boost curve as is illustrated, the shut-off region 44 of boost curve 40 is sharp and thus has a less linear feel to the steering system.

Figure 5:
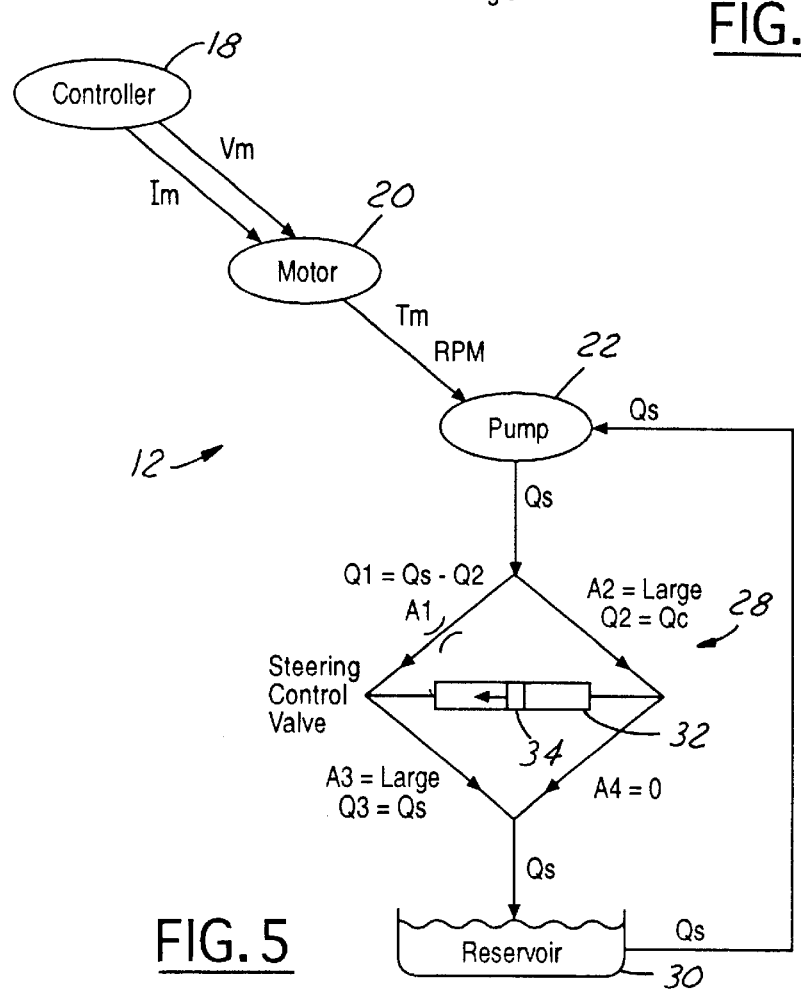
FIG. 5 is a block diagram of the present invention in operation.

Referring now to FIG. 5, a steering system 12 in operation is illustrated. As is shown, piston 34 is moving leftward in the picture. Thus, the flow through orifice A2 is large. As illustrated, the flow rate through orifice A2 is Q2 or Qc. The flow rate through orifice A1 is Q1 which is equal to Qs minus Q2. The flow rate through orifice A4 is zero and thus the flow rate through orifice A3 is large and equal to the full flow Qs.

Figure 6:
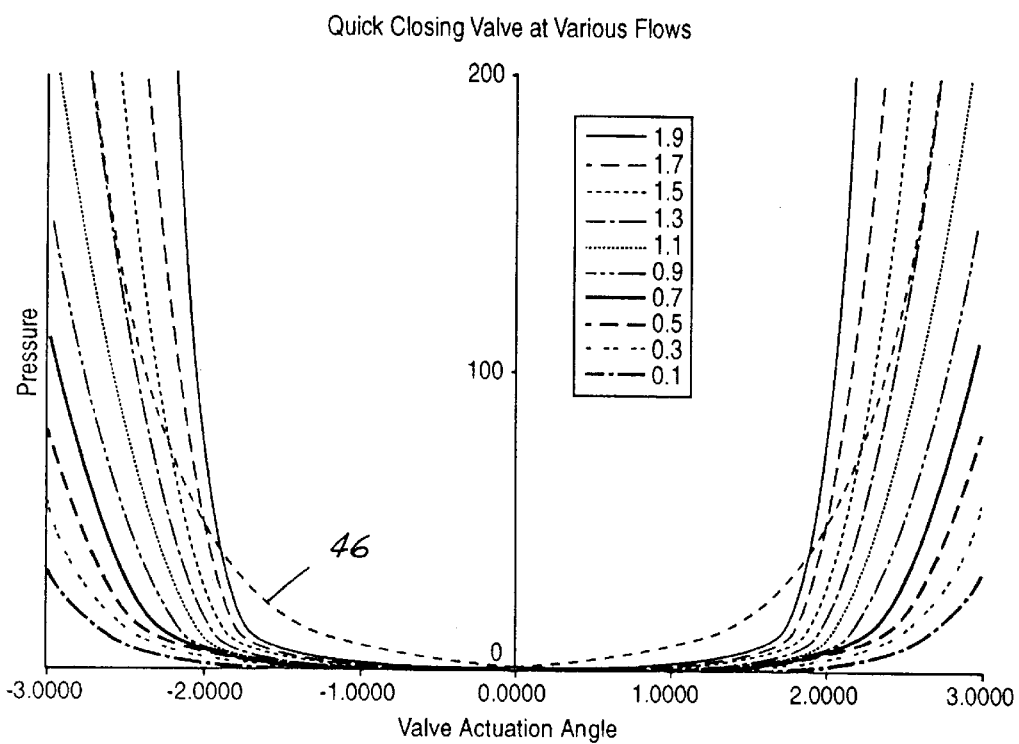
FIG. 6 is a plot of a modified boost curve according to the present invention.

Referring now to FIG. 6, a desired boost curve 46 is illustrated in contrast to typical boost curves for a quick closing valve at various flow rates. As is illustrated, the desired boost curve 46 has less sharp transitions and is not dependent upon a single flow rate. In operation, controller 18 uses the motor current (Im) to effect the desired boost curve 46. The motor current is proportional to motor torque which in turn is directly related to the pump outlet pressure.

One example of a desired application of the present invention is in a progressingly reducing radius curve. In prior electro-hydraulic power assisted steering applications, the feel of the steering wheel remains the same. However, it would be desirable to provide increasing torque to increase the steering feel and thus provide feedback to the driver that the curve is progressively reducing.

By using the quick closing valve, parking efforts are reduced. This allows the use of a stiffer torsion bar than is previously used in electro-hydraulic power assisted steering systems. Thus, at high speeds center feel is improved by the use of the stiffer torsion bar and a reduction in the flow of the steering system. Also, average current draw and fuel economy are improved because lower flow rates are possible with a quick closing valve. Peak current draw which occurs during static parking is also significantly reduced because the quick closing boost curve produces acceptable efforts with significantly lower flow rates.

Linearity is improved by using the desired boost curve that has a more gradual transition from no assist condition to assist levels required for maneuvering at slow to moderate speeds. Without modification, the quick closing boost curve exhibits an abrupt transition producing an on/off non-linear feel.

While particular embodiments of the invention have been shown and described, numerous variations and alternate embodiments will occur to those skilled in the art. Accordingly, it is intended that the invention be limited only in terms of the appended claim.

What is claimed is:

1. A power steering system for an automotive vehicle comprising:
    a steering control valve;
    a pump coupled to said control valve;
    a motor coupled to said pump;
    a controller coupled to said motor, said controller generating a control signal having a voltage and a current, said controller generating a desired motor current in response to a desired flow rate and valve angle of said control valve.

2. A power steering system as recited in claim 1 wherein said valve comprises a quick closing valve.

3. A method of controlling a steering system having a pump and motor comprising the steps of:
    detecting motor current in the motor;
    determining a pump outlet pressure as a function of a motor current;
    determining a desired flow rate to attain a desired boost curve;
    operating the pump and changing a control valve angle to attain the desired boost curve.

4. A method as recited in claim 3 wherein said step of determining a desired flow rate comprises determining a desired flow rate not in response to vehicle speed and pump outlet pressure.

5. A method of controlling a steering system comprising:
    determining a desired torque on a motor;
    determining a desired boost curve;
    operating the motor with a predetermined current to attain the desired torque; and operating the pump and changing a control valve angle to attain the desired boost curve.

* * * * *